Aug. 26, 1924.
C. P. HOEFLER
1,506,238
GLARESHIELD FOR VEHICLE HEADLIGHTS
Filed Sept. 7, 1923    3 Sheets-Sheet 2
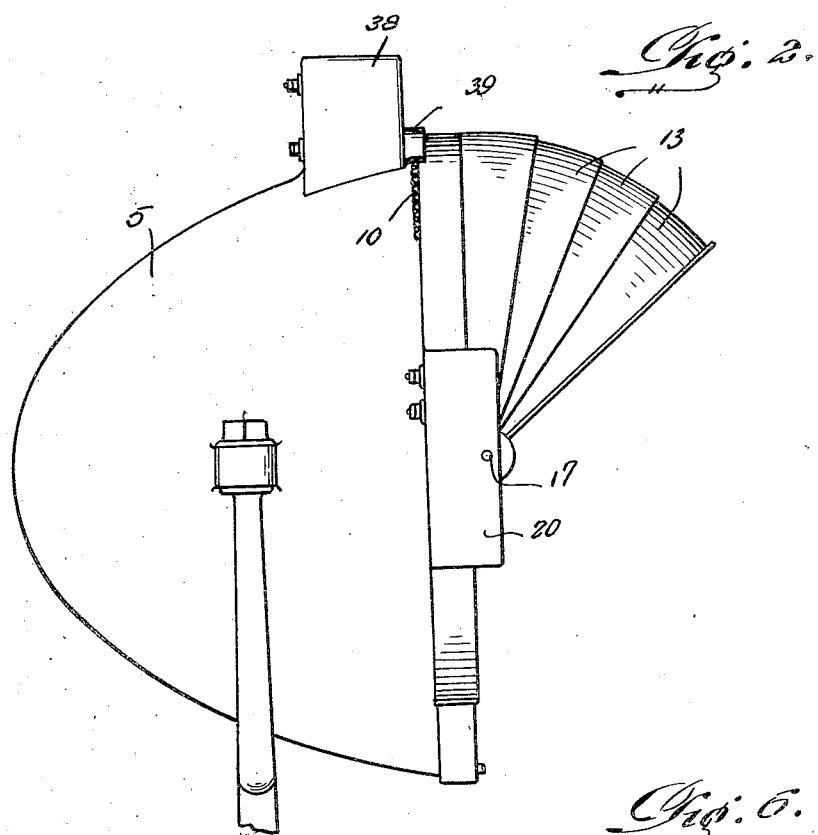
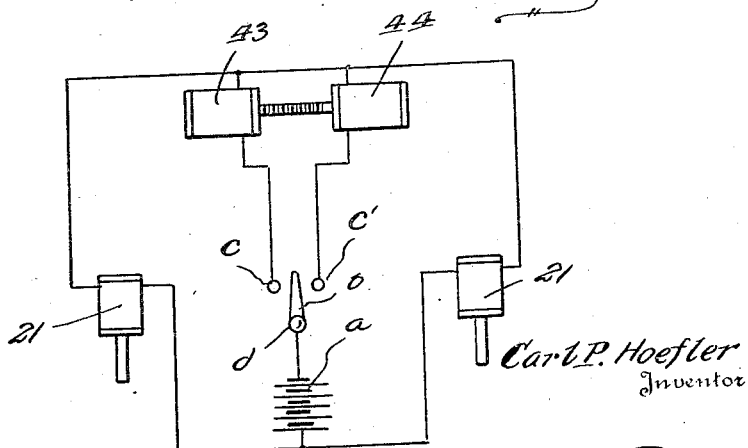

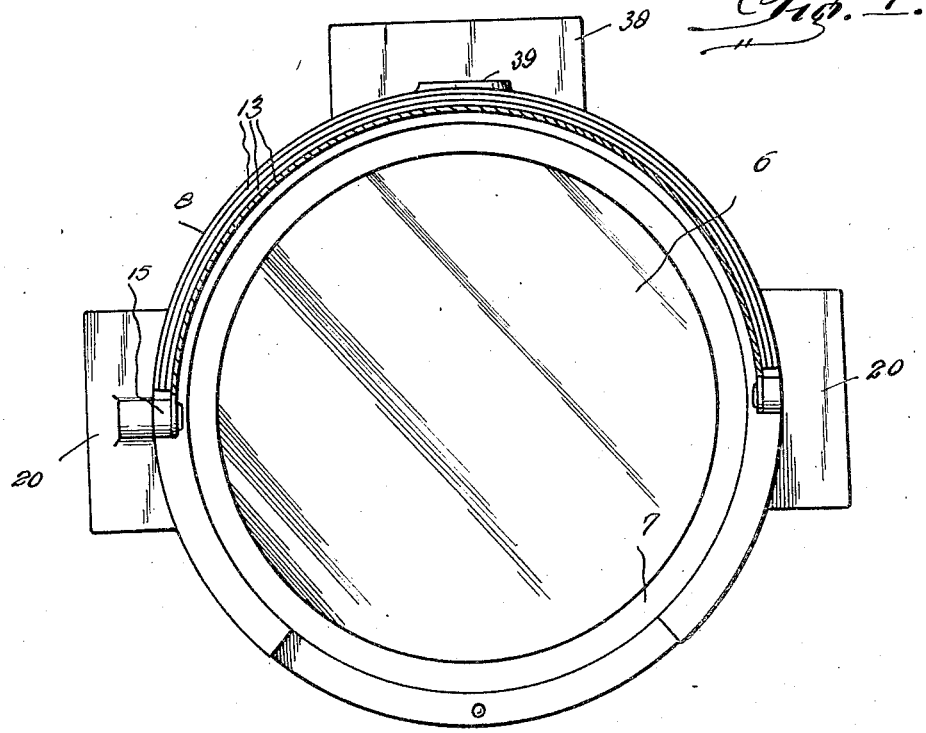
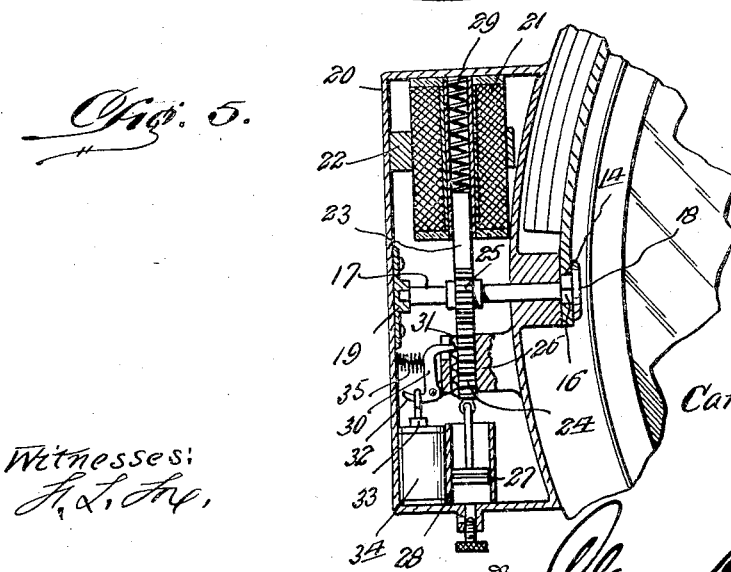

Aug. 26, 1924.  
C. P. HOEFLER  
1,506,238  
GLARESHIELD FOR VEHICLE HEADLIGHTS  
Filed Sept. 7, 1923  
3 Sheets-Sheet 3

Carl P. Hoefler,  
Inventor

Witnesses:

By  
Attorney

Patented Aug. 26, 1924.

1,506,238

UNITED STATES PATENT OFFICE.

CARL PERRY HOEFLER, OF SYRACUSE, NEW YORK.

GLARESHIELD FOR VEHICLE HEADLIGHTS.

Application filed September 7, 1923. Serial No. 661,400.

*To all whom it may concern:*

Be it known that I, CARL PERRY HOEFLER, a citizen of the United States, residing at Syracuse, in the county of Onondaga and State of New York, have invented certain new and useful Improvements in Glareshields for Vehicle Headlights, of which the following is a specification.

In carrying out the present invention it is my purpose to provide a glare shield for the headlights of vehicles wherein the light rays from the headlights may be directed downwardly and at opposite sides of the road as desirable whenever another machine is approaching, for consequently preventing the blinding of the driver of the oncoming vehicle.

The primary object of this invention is to provide a glare shield for the headlights of vehicles, that is extremely simple of construction and of such a nature as to be readily associated with practically all types of headlights with which I am at present familiar.

A further object of my invention resides in the provision of such a device wherein the shield comprises a shutter element comprising shutter slats that is operated automatically under the control of the operator of the vehicle whenever the emergency arises.

A still further object of my invention is to provide such a device wherein means is present for opening the shutter and simultaneously causing the swinging movement of the same about the front side of the headlight for directing the light rays to the outer side of the road, that is, in a direction toward the right or left.

Yet another object is the provision of such a glare shield that is comparatively speaking, simple of construction and one that will embrace at the same time the desired features of efficiency and durability.

With the above and other objects in view as the nature of the invention will be better understood, the same comprises the novel form, combination and arrangement of parts set forth in the following detailed specification, shown in the accompanying drawings and claimed.

Figure 3:
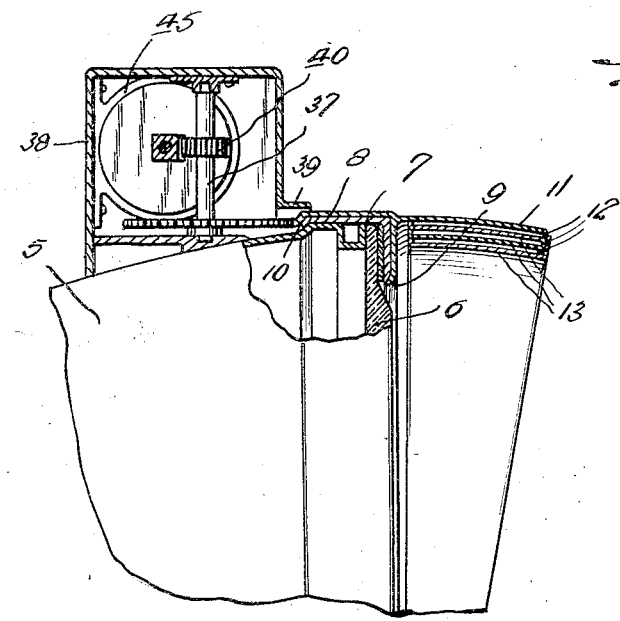
Figure 4:
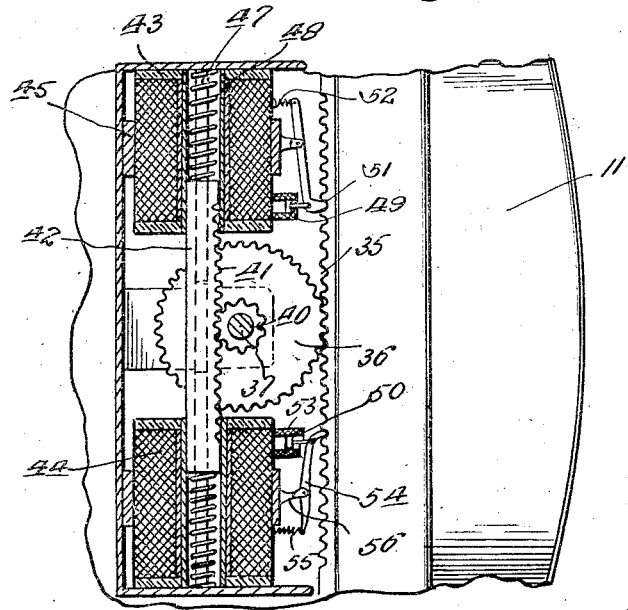

In the drawings wherein like reference characters indicate corresponding parts throughout the several views, Figure 1 is a front elevational view of a conventional type headlight equipped with my improved glare shield, a portion of this shield being shown in cross section, Figure 2 is a side elevational view of the headlight equipped with my glare shield, the same being shown in extended operative position, Figure 3 is an enlarged fragmentary longitudinal sectional view through the headlight, Figure 4 is an enlarged transverse sectional view through the means for causing the before mentioned shutter to move to opposite sides of the headlight as the case may be, Figure 5 is an enlarged fragmentary sectional view through one of the means for causing the opening and closing of the shutter, and Figure 6 is a diagrammatic view of the wiring circuit.

Now having particular reference to the drawings, 5 indicates a headlight casing that is open at its front side and provided at this side with a lens 6 that is maintained in position upon the open side of the casing through the medium of the usual lens retaining rim 7. The form of headlight shown is of a very conventional type and it is to be understood that I do not wish to limit myself to the application of my invention to this particular type of headlight, as in the future practice of the invention modifications may be made therein whereby the same may be adapted for application to widely varying types of headlights.

My invention embodies the provision of a metallic somewhat horseshoe shaped rim 8 that is positioned and freely slidable upon the before mentioned lens retaining rim 7 of the headlight. As more clearly shown in Figure 3, this last mentioned rim 8 is of general L-shape in cross section the lower edge of the foremost portion thereof being slightly bent inwardly at 9 for engaging beneath the adjacent edge of the head lens rim 7 which co-operates with the downwardly bent portion 10 of the top part of this rim 8 for preventing the removal of this rim from said head lens rim 7.

The rim 8 is formed upon its front side and adjacent its upper end with a forwardly extending concavo-convexed head 11 the front edge of which converges inwardly from its central point to its opposite ends as clearly shown, the front edge of this hood terminating in a pendant flange 12 for purposes presently to be described.

Freely movable in reverse longitudinal direction between this hood 11 is a series of shutter slats 13 of a shape similar to the shape of said hood 11, the front edges of these shutter slats terminating in pendant flanges while the rear ends thereof terminate in upwardly extending flanges whereby when the lowermost shutter slat is swung forwardly or rearwardly as hereinafter described, the remaining shutter slats will be moved to an open or closed position, it being obvious that the front edge of the lowermost shutter slat 18 must be provided with a relatively wider flange for consequently engaging the front flanges of the remaining shutter slats for positively causing the closing movement of the remaining shutter slats when this lowermost shutter slat is caused to move in a rearward direction.

The opposite ends of the lowermost one of the shutter slats 13 extend beneath the opposite ends of the remaining ones of said shutter slats and are provided with squared openings 14, Figure 5, each of these squared openings being co-extensive with an open ended bore in a boss 15 formed upon the rim 8, it being obvious from Figure 5 that one of these bosses is formed upon diametrically opposite sides of said rim. The elements now to be described are in duplicate upon opposite sides of the headlight, and a description of one set of elements will suffice for both.

Within said squared opening 14 at each end of said lowermost one of the shutter slats 13 is the squared portion 16 formed adjacent one end of a relatively short horizontal shaft 17 the inner end of which is headed at 18 for preventing disengagement of the shutter slats therefrom while the opposite end is journaled within a bearing 19 upon the adjacent wall of a casing 20 that is formed upon said rim 8. Within this casing at the upper end thereof is a solenoid magnet 21 carried by a suitable form of clamp 22, the core 23 of this magnet being formed with rack teeth 24 upon its front side for intermesh with the teeth of a spur gear 25 keyed to the before mentioned shaft 17. This core 23 has free sliding movement through a guide 26 that is formed upon the before mentioned rim 8 and is attached at its lower end to a piston 27 that has rectilinear movement within a dash pot 28 for obviously preventing the quick opening and closing of the before mentioned shutter slats 13.

The before mentioned core 23 is normally projected outwardly of the magnet through the medium of an expansible spring 29 within said magnet and as a means for preventing accidental movement of the core and a consequent rattling of the shutter slats 13 there is provided a dog 30 pivoted to the before mentioned guide 26 and engaging at its upper end through a slot in said guide for contact with teeth 31 formed upon the adjacent side of said core, the lower end of this dog being formed with an outwardly extending curved finger 32 that is operatively connected to the core 33 of a solenoid magnet 34. This dog 30 is normally forced into engagement with said teeth 31 through the medium of an expansible spring 35, it being obvious that whenever it is desired to energize the before mentioned solenoid magnet 21 it will be necessary to complete the circuit to the last mentioned solenoid 34 for thereby retracting said dog 30 from the teeth 31 and allowing the core 23 to be forced outwardly of the magnet through the medium of the spring 29 or drawn inwardly thereto as the case may be for opening or closing the shutters, it being manifest that when this magnet 29 is energized the core 23 will be drawn upwardly for consequently opening the shutter slats. By breaking the circuit to this magnet 29 and making the circuit to the magnet 34 the spring 29 which of course co-operates with the similar spring upon the casing at the opposite side of the head lamp for thereby projecting the cores 23 downwardly and consequently moving the shutter slats to a closed position as per Figure 3.

The flanged edge of the uppermost part of the sliding rim 8 is provided for a portion of its length with rack teeth 35 that are in mesh with the teeth of a relatively large spur gear 36 keyed adjacent the lower end of a vertical shaft 37 the opposite ends of which are suitably journaled in bearings upon the top and bottom walls of a relatively elongated casing 38 that is formed upon or otherwise suitably secured to the top side of the headlight casing 5, Figure 3, it being obvious that the front wall of this casing adjacent its lower edge must be provided with a slot for permitting of the passage of said gear 36 therethrough it being preferable that the top edge of this slot be formed with an outwardly extending flange 39 for preventing the entrance of water, dirt or other foreign matter into this casing and thereby impairing the operating efficiency of the elements therein.

Keyed to this shaft 37 intermediate its ends is a relatively smaller spur gear 40 that has mesh with teeth 41 formed upon the front side of a hollow magnetic core 42 that has sliding movement at its opposite ends within solenoid magnets 43 and 44 within opposite ends of the before mentioned casing 38 and which are supported therein by clamps 45. This core 42 is guided within the magnets 43 and 44 by pins 47 one of which is carried by each of the magnets and extends outwardly thereof as more clearly shown in Figure 4. Surrounding each of these pins 47 within its respective magnet is an expansible spring 48 that serves as a means for normally projecting the core 42 outwardly of each of said magnets 43 and 44 for thereby maintaining the rim 8 that carries the shutter slats 13 in a central position upon the headlight as shown in the different figures.

Suitable electro-magnetically controlled stop devices 49 and 50 are provided for maintaining the rim 8 and shutter slats in different positions upon the headlight, the stop device 49 preferably including a solenoid magnet within which is slidable a pin 51 that is normally forced outwardly thereof through the medium of a spring 52 for engagement with the teeth formed upon said rim 8. The other stop device 50 preferably includes an electro-magnet 53 the core of which is operatively connected to a dog 54 the head of which normally engages the before mentioned teeth 35 through the medium of a coiled spring 55 secured at one end to the opposite end of the dog and at its other end to said before mentioned magnet 44 it being of course understood that this dog 54 must necessarily be pivoted to a suitable bracket 56. Each of the solenoid magnets of the stop devices 49 and 50 is in circuit with both of the before mentioned solenoid magnets 43 and 44, whereby when the circuit is completed to either one of these magnets these stop devices will be actuated for allowing the rim 8 to slide in opposite directions upon the lens retaining rim 7 of the headlight.

In Figure 6 wherein there is shown a wiring diagram between the main solenoid magnets of my invention and a suitable source of electric supply, preferably the storage battery of the vehicle, it will be noted that the solenoid magnets 21—21 are in open circuit with the storage battery $a$ through the medium of a two-way switch designated generally $b$ it being also noted that these magnets 21—21 have electrical connection with each of the solenoid magnets 43 and 44 in the casing 38 whereby when the circuit is completed to either one of the magnets 43 or 44 the circuit will simultaneously be completed to both of the magnets 21—21. The two-way switch $b$ comprises a pair of stationary contacts $c$ and $c'$ and a movable contact $d$ this movable contact being electrically connected to one pole of said battery A the opposite pole thereof being electrically connected to said magnets 21—21. This switch $b$ is preferably mounted upon the instrument board of the vehicle and it will be obvious that when it is desired to open the shutter slots 13 and move the same in a direction around the headlights toward the left the switch blade $b$ will be moved to the left for consequently completing the circuit to the magnets 21—21 for opening the shutter slots and simultaneously completing the circuit to the magnet 43 for thereby moving the glare shield around the headlight lens shading rim 7 as above set forth.

Any desirable form of switch and wiring circuit may be employed for the operation of the solenoids 34.

In view of the above description when considered in conjunction with the accompanying drawings, it will at once be apparent that I have provided a highly novel and useful form of glare shield for vehicle headlights and one that will answer all of the purposes above ascribed and one that will also meet with all of the requirements for a successful commercial use.

Even though I have herein set forth the most practical embodiments of this invention with which I am at the present time familiar it is nevertheless to be understood that minor changes may be made therein without departing from the spirit and scope of the appended claims.

Having thus described my invention, what I claim as new and desire to secure by Letters Patent is:—

1. In a glare shield for headlights, a rim disposed upon the lens retaining rim of the headlight and freely slidable thereon, a shutter carried by said rim, and means for moving said shutter to opposite sides of said headlight.

2. In a glare shield for headlights, a rim positioned upon the lens retaining rim of the headlight and freely slidable thereon, a moving shutter carried by said rim, and means for moving said rim to opposite sides of said headlight.

3. In a glare shield for headlights, a rim positioned upon the lens retaining rim of the headlight and freely slidable thereon, a moving shutter carried by said rim, means for opening and closing said shutter, and means for moving said rim to opposite sides of said headlight.

4. In a glare shield for headlights, a rim positioned upon the lens retaining rim of the headlight and freely slidable thereon, a folding shutter carried by said rim, electric means for opening said shutter, means normally acting to close said shutter, and means for moving said rim to opposite sides of said headlight.

5. In a glare shield for headlights, a rim positioned upon the lens retaining rim of the headlight and freely slidable thereon, a folding shutter carried by said rim, means for opening and closing said shutter, and manually controlled means for sliding said rim to either side of said headlight when the same is being opened, and means for moving said rim to its normal position as the shutter is being closed.

6. In a glare shield for headlights, a rim positioned upon the headlight lens retaining rim, a folding shutter carried by said rim, electrical means for opening said shutter, automatic means for closing said shutter, means for sliding said rim to opposite sides of said headlight, and means for limiting the sliding movement of said rim in opposite directions.

7. In a glare shield for headlights, a rim positioned upon the headlight lens retaining rim, a folding shutter carried by said rim, electrical means for opening said shutter, automatic means for closing said shutter, means for sliding said rim to opposite sides of said headlight, means for limiting the sliding movement of said rim in opposite directions, said means comprising a stop pin carried by said headlight lens retaining rim at the lower side thereof and adapted to be engaged by the opposite ends of said shutter carrying rim.

8. In a glare shield for headlights, a rim positioned upon the lens retaining rim of the headlight and freely slidable thereon, a folding shutter carried by said rim, electrical means for moving said rim to opposite sides of said headlight, and means operable simultaneously with said electrical means for opening said shutter as the same is moved toward opposite sides of said headlight.

9. In a glare shield for headlights, a rim positioned upon the lens retaining rim of the headlight and freely slidable thereon, a folding shutter carried by said rim, electrical means for moving said rim to opposite sides of said headlight, means operable simultaneously with said electrical means for opening said shutter as the same is moved toward opposite sides of said headlight, and means for closing said shutter as the same is being returned to its normal position.

10. In a glare shield for headlights, a rim positioned upon the lens retaining rim of the headlight and freely slidable thereon in opposite directions, a shutter carried by said rim, manually controlled means for sliding said rim in opposite directions upon said lens retaining rim, and manually controlled means for locking said rim in its normal or slid positions.

11. In a glare shield for headlights, a rim positioned upon the lens retaining rim of the headlight and freely slidable thereon in opposite directions, a shutter carried by said rim, manually controlled means for sliding said rim in opposite directions upon said lens retaining rim, means for locking said rim in its normal or slid positions, means for releasing said rim, and automatic means for returning the same to its normal position when said means is released.

12. In a glare shield for headlights, a rim positioned upon the lens retaining rim of the headlight and freely slidable thereon in opposite directions, a folding shutter carried by said rim, manually controlled means for opening and closing said shutter, means for locking said shutter in its closed position, means for releasing said first mentioned means, and means for sliding said rim in opposite directions upon said lens retaining rim.

In testimony whereof I affix my signature.

CARL PERRY HOEFLER